US010986700B2

(12) United States Patent
Richmond et al.

(10) Patent No.: US 10,986,700 B2
(45) Date of Patent: Apr. 20, 2021

(54) SENSOR ASSEMBLY WITH INTEGRAL DEFROSTER/DEFOGGER

(71) Applicant: APTIV TECHNOLOGIES LIMITED, St. Michael (BB)

(72) Inventors: Zachary J. Richmond, Warren, OH (US); Evangelia Rubino, Warren, OH (US)

(73) Assignee: APTIV TECHNOLOGIES LIMITED

( * ) Notice: Subject to any disclaimer, the term of this patent is extended or adjusted under 35 U.S.C. 154(b) by 609 days.

(21) Appl. No.: 15/454,173

(22) Filed: Mar. 9, 2017

(65) Prior Publication Data

US 2018/0263082 A1 Sep. 13, 2018

(51) Int. Cl.
| | | |
|---|---|---|
| *H05B 3/84* | (2006.01) | |
| *B60R 11/02* | (2006.01) | |
| *H05B 3/14* | (2006.01) | |
| *G01S 7/521* | (2006.01) | |
| *G01S 7/481* | (2006.01) | |
| *G01S 7/52* | (2006.01) | |

(Continued)

(52) U.S. Cl.
CPC ............... *H05B 3/84* (2013.01); *B60R 11/02* (2013.01); *G01S 7/4813* (2013.01); *G01S 7/521* (2013.01); *H05B 3/146* (2013.01); *B60R 2011/004* (2013.01); *G01S 7/52006* (2013.01); *G01S 2007/027* (2013.01); *G01S 2007/4043* (2013.01); *G01S 2007/4977* (2013.01); *H04N 7/183* (2013.01); *H05B 2203/02* (2013.01); *H05B 2214/02* (2013.01); *H05B 2214/04* (2013.01)

(58) Field of Classification Search
CPC .. H05B 1/0236; H05B 1/0202; H05B 3/0014; H05B 3/84; H05B 3/146
USPC .......................... 219/200, 202, 205, 208, 209
See application file for complete search history.

(56) References Cited

U.S. PATENT DOCUMENTS 4,702,619 A * 10/1987 Camp ..................... G01K 7/22
 116/303
5,854,708 A * 12/1998 Komatsu ............... C03C 17/256
 359/512

(Continued)

FOREIGN PATENT DOCUMENTS

DE 19720808 A1 7/1998
EP 693400 A2 1/1996

(Continued)

*Primary Examiner* — Robert J Utama
*Assistant Examiner* — Ayub A Maye
(74) *Attorney, Agent, or Firm* — Billion & Armitage

(57) ABSTRACT

A sensor assembly configured for use in a motor vehicle is presented. The sensor assembly includes a sensor device such as a camera, LIDAR, RADAR, or ultrasonic transceiver, and a housing that is at least partially formed of an electrically conductive polymeric material. The housing has a pair of electrically conductive terminals connected to the electrically conductive polymeric material. The pair of electrically conductive terminals are configured to be interconnected with an electrical power supply. When the terminals are connected to the power supply, the housing heats to remove snow, ice, frost and/or condensation from the sensor assembly. The sensor assembly is suitable for use with a back-up camera, blind spot warning system, lane departure warning system, adaptive cruise control system and/or autonomous driving control system.

23 Claims, 3 Drawing Sheets

(51) Int. Cl.
*H04N 7/18* (2006.01)
*B60R 11/00* (2006.01)
*G01S 7/497* (2006.01)
*G01S 7/40* (2006.01)
*G01S 7/02* (2006.01)

(56) References Cited

U.S. PATENT DOCUMENTS

| | | | |
|---|---|---|---|
| 7,731,373 B2 | 6/2010 | Oskarsson et al. | |
| 7,783,400 B1 * | 8/2010 | Zimler | B60S 1/0866 219/202 |
| 8,119,314 B1 * | 2/2012 | Heuft | G03G 5/0589 399/159 |
| 8,170,772 B2 * | 5/2012 | Nagashima | F02D 41/064 123/179.5 |
| 8,899,761 B2 * | 12/2014 | Tonar | B60S 1/56 359/511 |
| 9,198,232 B2 | 11/2015 | Lashmore et al. | |
| 10,479,287 B2 * | 11/2019 | Sliwa | B60S 1/0848 |
| 2005/0046569 A1 | 3/2005 | Spriggs et al. | |
| 2006/0239664 A1 | 10/2006 | Chaput | |
| 2011/0073142 A1 * | 3/2011 | Hattori | B60S 1/0848 134/56 R |
| 2011/0249120 A1 | 10/2011 | Bingle et al. | |
| 2011/0266375 A1 * | 11/2011 | Ono | B60S 1/0848 239/589 |
| 2012/0229882 A1 * | 9/2012 | Fish, Jr. | B60R 1/025 359/267 |
| 2013/0146577 A1 | 6/2013 | Haig et al. | |
| 2014/0124495 A1 | 5/2014 | Feng et al. | |
| 2016/0200264 A1 | 7/2016 | Bingle et al. | |
| 2017/0084176 A1 * | 3/2017 | Nakamura | G06T 7/70 |
| 2017/0334366 A1 * | 11/2017 | Sliwa | B60R 11/04 |
| 2018/0179940 A1 * | 6/2018 | Hall | F01N 3/2066 |

FOREIGN PATENT DOCUMENTS

| | | |
|---|---|---|
| JP | 2012037548 A | 2/2012 |
| WO | 9722227 A1 | 6/1997 |

* cited by examiner

SENSOR ASSEMBLY WITH INTEGRAL DEFROSTER/DEFOGGER

TECHNICAL FIELD OF THE INVENTION

The invention generally relates to sensor assemblies, and more particularly relates to a sensor assembly with an integral defroster and/or defogger used in a motor vehicle.

BACKGROUND OF THE INVENTION

Sensors such as cameras, radio detection and ranging (RADAR), light detection and ranging (LIDAR), and ultrasonic sensors are used in today's vehicles to provide an input for safety related systems such as a back-up camera, blind spot warning, lane departure warning, and adaptive cruise control. These sensors are also key inputs for autonomous driving control systems. These sensors must be free of ice, snow, frost, and condensation in order to operate most effectively. Current sensors depend on their location inside the vehicle cabin to provide ice and snow removal due to windshield defroster and windshield wiper systems. However, not all sensors can be effectively packaged within the vehicle cabin. Those sensors depend on manual clearing by the vehicle operator prior to entering the vehicle. However, there is risk that the manual clearing could result in damage to the sensor. In addition, snow and ice may build up on the senor while the vehicle is driving, requiring the vehicle operator sot stop and again manually clear the sensor.

Therefore, a sensor that can be mounted outside of the vehicle cabin that is capable on removing ice, snow, frost, and/or condensation from the sensor remains desired.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with an embodiment of the invention, a sensor assembly configured for use in a motor vehicle is provided. The sensor assembly includes a sensor device and a housing at least partially formed of an electrically conductive polymeric material. The housing has a pair of electrically conductive terminals connected to the electrically conductive polymeric material. The pair of electrically conductive terminals are configured to be interconnected with an electrical power supply.

The walls of the housing may be formed of the electrically conductive polymeric material. The electrically conductive polymeric material may be a dielectric polymer material filled with conductive particles. The conductive particles may be carbon black particles, graphene particles, fullerene particles, carbon nanotubes, metallic particles, metallic fibers, and/or metal plated fiber particles.

The dielectric polymer material may be a highly crystalline polymer and the electrically conductive polymeric material may have a positive temperature coefficient (PTC) electrical resistance property.

The housing further may further include a transparent window and the sensor device may be an optical sensor device such as a visible light camera or light detection and ranging (LIDAR) transceiver. The transparent window may be formed of the electrically conductive polymeric material. The electrically conductive polymeric material may be a transparent polymer material filled with conductive particles such as metallic nanowires, metal-plated nanofibers, carbon nanotubes, graphene nanoparticles, and/or graphene oxide nanoparticles.

Alternatively, the sensor device may be a radio detection and ranging (RADAR) transceiver or an ultrasonic transceiver.

The electrically conductive polymeric material may include an inherently conductive polymer such as a conjugated polymer, radical polymer, and/or electro-active polymer.

The sensor assembly may further include a temperature sensing element. The sensor assembly may be disposed on the motor vehicle outside of a passenger compartment. The sensor assembly may be a component of an automated vehicle control system.

BRIEF DESCRIPTION OF THE SEVERAL VIEWS OF THE DRAWING

The present invention will now be described, by way of example with reference to the accompanying drawings, in which.

Reference numbers of similar elements in the various illustrated embodiments share the last two digits of their reference numbers.

DETAILED DESCRIPTION OF THE INVENTION

A sensor assembly, such as those used in a motor vehicle for blind spot detection, automated parking assist, lane keeping, back-up monitors, and/or automated vehicle control, is described herein. The sensor assembly has a housing that is formed of a conductive plastic material. When an electrical current is applied to the housing, the electrical resistance of the conductive plastic material causes heating of the housing that can melt snow and ice or remove frost or condensation (fogging) on the housing, thereby reducing or eliminating any degradation of the senor function that may be caused by these conditions. The housing does not need any additional heating circuits, e.g. resistive wires, to heat the housing to remove snow, ice, frost, or condensation from the housing, generically referred to hereafter as defrosting. Such a housing is well suited for placement on the motor vehicle outside of the cabin since it does not need to rely on any other vehicle systems, such as window defrosters.

Figure 1:
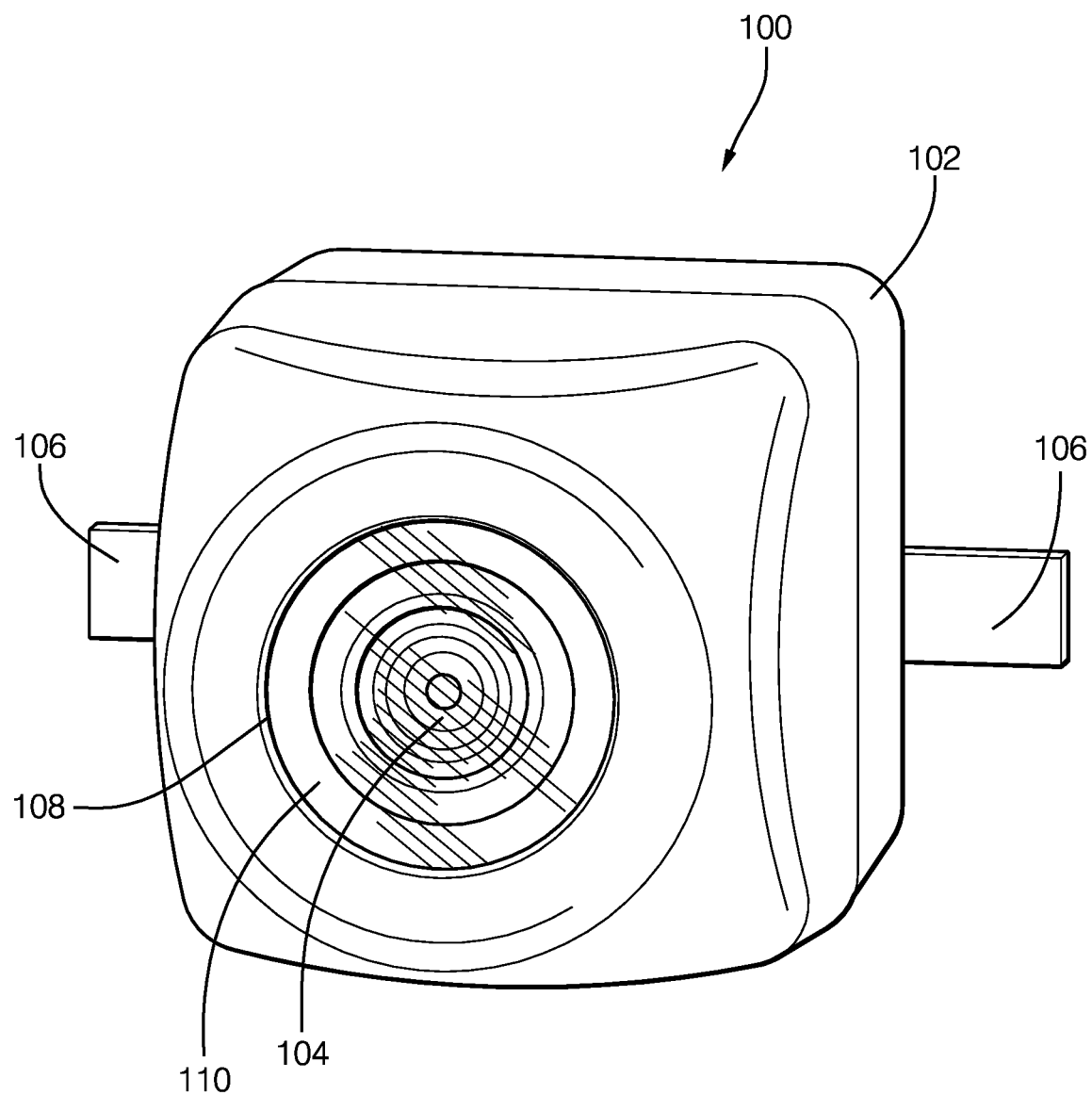
FIG. 1 is a perspective view of a sensor assembly including an optical sensor and a housing according to a first embodiment.

FIG. 1 illustrates a non-limiting example of a sensor assembly 100. The sensor assembly 100 includes a housing 102 formed of an electrically conducive plastic and a sensor device 104 contained within the housing 102. The housing 102 includes two terminals 106 that are connected to an electrical power supply (not shown). The housing 102 is formed of a thermoplastic material such as polycarbonate (PC), polyamide (nylon), polypropylene (PP), acrylonitrile butadiene styrene (ABS), polybutylene terephthalate PBT, or a combination of these materials that is filled with conductive particles such as carbon black particles, graphene particles, fullerene particles, carbon nanotubes, metallic particles, metallic fibers, and metal plated fiber particles to provide electrical conductivity to the material. Alternatively, the housing 102 may be formed of an inherently conductive polymer. Examples of inherently conductive polymers include conjugated polymers, radical polymers, and electro-active polymers The terminals 106 may be threaded metal bushings or metal tabs that are insert molded into the housing 102 and are configured to be connected to wires leading to the electrical power supply.

Without subscribing to any particular theory of operation, when electrical current flows from the first terminal 106 to the second terminal 106, the electrical resistance of the material forming the housing 102 causes the temperature of the housing 102 to increase. The electrical current supplied to the housing 102 is preferably regulated to increase the surface temperature of the housing 102 above 0° C. to melt any show or ice on the housing 102 or alternatively increase the surface temperature above the dew point to remove any condensation from the housing 102 while keeping the temperature below the softening or melting point of the electrically conducive plastic forming the housing 102. The electrical current supplied to the terminals 106 is preferably direct (non-alternating) current.

Regulation of the current may be provided by a feedback circuit (not shown) that includes a temperature sensor, such as a thermistor, embedded within the sensor assembly 100 to a controller (not shown). This temperature sensor could also be used by the controller to determine the temperature of the sensor assembly 100 and active the power supply to send current to the terminals 106 when the temperature of the sensor assembly 100 is determined to be below freezing or dew point temperatures.

Alternatively or additionally, the electrical current provided form the power supply to the housing 102 may be regulated by using an electrically conductive plastic material to form the housing 102 that has a positive temperature coefficient (PTC) property, that is the electrically conductive plastic material has the property of increased electrical resistance as the temperature of the electrically conductive plastic material increases. Electrically conductive plastic materials having a highly crystalline polymer base material, such as polypropylene and nylon, exhibit this PTC property.

The PTC property of the electrically conductive plastic material relates to the temperature at which the material makes a change from a phase that is electrically conductive to a phase that is electrically nonconductive. Again, without subscribing to any particular theory of operation, the electrically conductive plastic material maintains its crystalline structure up to a certain phase change temperature, in most cases around 60° C., when it changes to an amorphous structure. This temperature is slightly lower than the electrically conductive plastic material's melting point, preferably low enough for the material to maintain its structural integrity. When below the phase change temperature, the conductive particles are inherently connected to form conductive pathways through the material. As the material approaches the phase change temperature, these conductive particles that were connected in the crystalline phase are disconnected from one another and "float" within the amorphous phase of the material. The housing 102 ceases to increase in temperature and maintains a fairly constant temperature since the current flowing though the material is greatly decreased.

Upon cooling below the phase change temperature, the electrically conductive plastic material reverts to its previous crystalline structure whereby the conductive particles reconnect, but not necessarily in the exact same configuration as before. Since the conductive particles do not reconnect in exactly the same way, the electrically conductive plastic material may become more resistive the second time it is brought to its phase change temperature. The electrically conductive plastic material may continue to become more resistive for about three or four more cycles to the phase change temperature until the resistance stabilizes and will remain consistent for thousands, perhaps hundreds of thousands of cycles.

Figure 2:
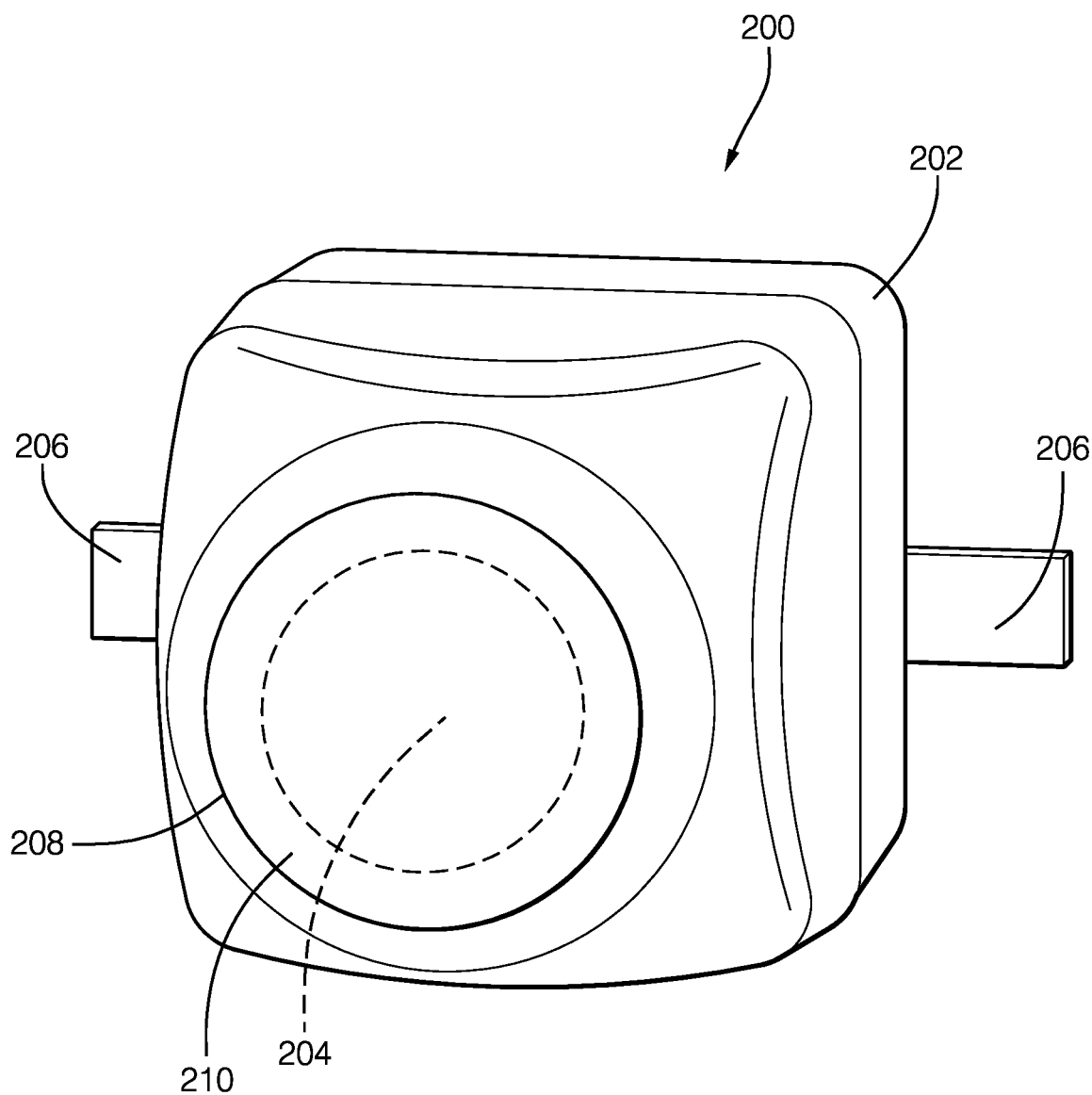
FIG. 2 is a perspective view of a sensor assembly including a non-optical sensor and a housing according to a second embodiment.

The sensor device 104 may be a visible light camera, RADAR transceiver, LIDAR transceiver, or ultrasonic transceiver. As used herein, a visible light camera refers to a camera that is sensitive to wavelengths in the range of 400 to 1000 nanometers. The housing 102 defines an opening 108 through which the sensor can observe the surrounding environment since light waves used by a camera or LIDAR receiver, sound waves used by an ultrasonic transceiver, and radio waves used by a RADAR transceiver may be attenuated or blocked by the electrically conductive plastic material forming the housing 102. The opening 108 of a housing 102 used with a LIDAR transceiver or camera may be covered by a transparent plastic material forming a window 110 as shown in FIG. 1. The opening of a housing 102 used with a RADAR transceiver or ultrasonic transceiver may be covered by a nonconductive opaque plastic material 210 as illustrated in FIG. 2.

Figure 3:
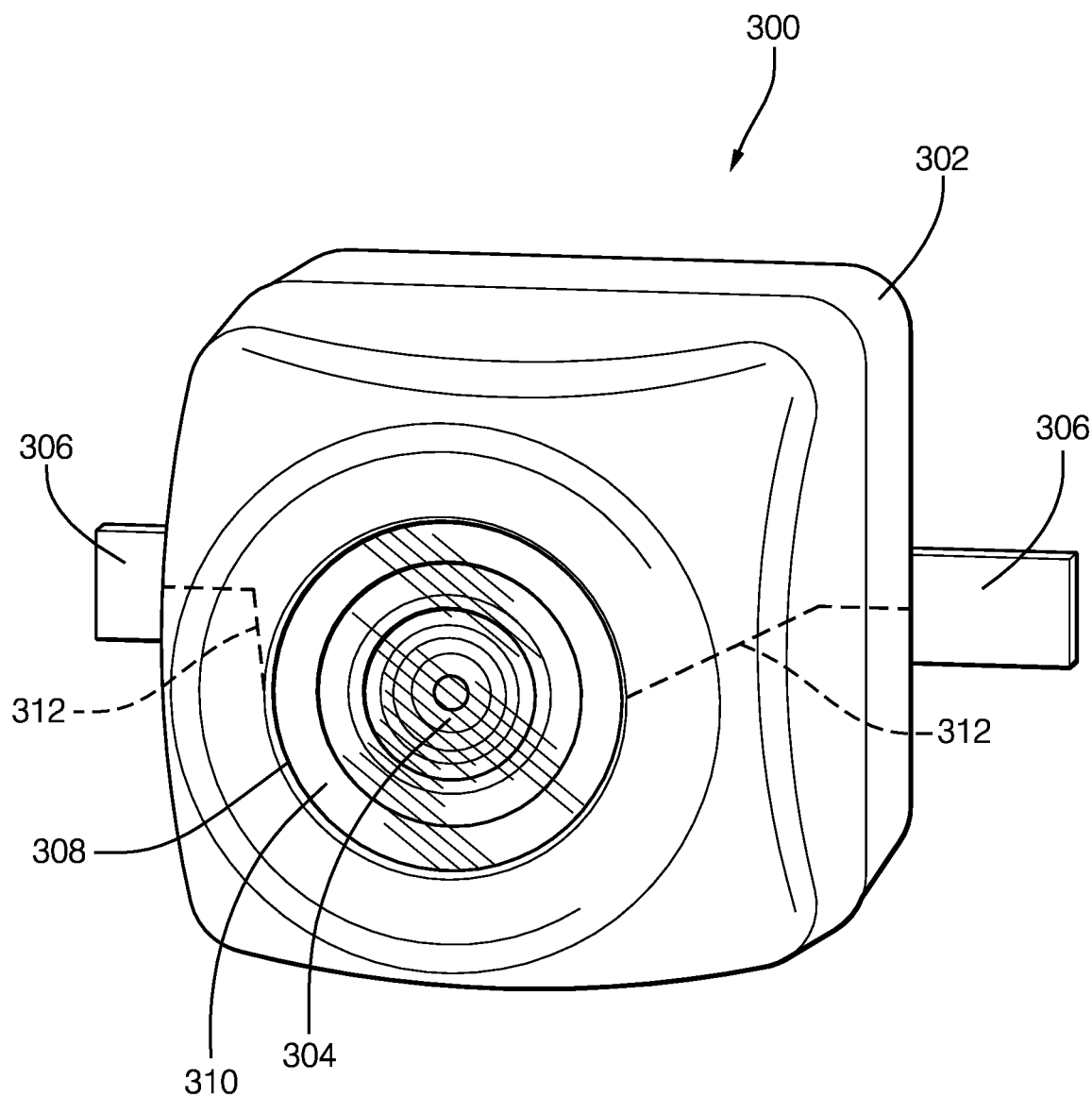
FIG. 3 is a perspective view of a sensor assembly including an optical sensor and a housing according to a third embodiment.

FIG. 3 illustrates another non-limiting example of a sensor assembly 300 similar to that shown in FIG. 1. However, the housing 302 of this sensor assembly 300 is formed of a nonconductive plastic and the transparent plastic material of the window 310 is formed of a transparent conductive plastic material such as a polycarbonate that contains nano-scale conductive particles such as metallic nanowires, metal-plated nanofibers, carbon nanotubes, graphene nanoparticles, or graphene oxide nanoparticles. As used herein, nano-scale particles have a size between 1 and 100 nanometers. The electrically conductive plastic window 310 is connected to the terminals 306 by wires or conductive traces 312, preferably disposed within the housing 102. This sensor assembly 200 provides the benefit of heating only the window needed by the camera or LIDAR transceiver rather than the entire housing 302, thereby reducing the electrical power required for defrosting the sensor assembly 300.

Other embodiments may be envisioned in which the window 310 formed of transparent conductive plastic material of FIG. 3 is incorporated into the housing 102 formed of an electrically conductive material of FIG. 1, wherein the window 310 is connected to the terminals 106 thought the housing 102 rather than separate conductors. Yet other alternative embodiments may be envisioned in which the material covering the opening 208 in FIG. 2 is formed of an electrically conductive plastic material filled with nano-scale conductive particles and is incorporated in the nonconductive plastic housing 302 of FIG. 3.

Accordingly, a sensor assembly is provided. The sensor assembly provides the benefit of electrically controlled defrosting capability, i.e. an integral defroster, without additional discrete heating elements, thereby reducing part count and assembly labor time.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items. Additionally, directional terms such as upper, lower, etc. do not denote any particular orientation, but rather the terms upper, lower, etc. are used to distinguish one element from another and locational establish a relationship between the various elements.

We claim:

1. A sensor housing assembly configured for placement on a motor vehicle outside of a passenger compartment and heated to remove snow, ice, frost, or condensation, the sensor housing assembly comprising:
   a sensor device; and
   a sensor housing formed of an electrically conductive polymeric material and defining an opening through which the sensor device can observe the surrounding environment,
   wherein the electrically conductive polymeric material comprises polypropylene or polyamide and conductive particles having a size between 1 and 100 nanometers,
   wherein the electrically conductive polymeric material has a positive temperature coefficient (PTC) electrical resistance property,
   wherein the sensor housing has a pair of electrically conductive terminals connected to the electrically conductive polymeric material and configured for interconnection with an electrical power supply.

2. The sensor housing assembly according to claim 1, wherein outer walls of the sensor housing are formed of the electrically conductive polymeric material.

3. The sensor housing assembly according to claim 1, wherein the conductive particles are carbon black particles.

4. The sensor housing assembly according to claim 1, wherein the housing comprises a transparent window covering the opening and wherein the sensor device is an optical sensor device.

5. The sensor housing assembly according to claim 4, wherein only the transparent window comprises the electrically conductive polymeric material.

6. The sensor housing assembly according to claim 1, wherein the conductive particles are metallic nanowires.

7. The sensor housing assembly according to claim 4, wherein the optical sensor device is a visible light camera.

8. The sensor housing assembly according to claim 1, wherein the sensor housing comprises a nonconductive opaque plastic material covering the opening and wherein the sensor device is a radio detection and ranging (RADAR) transceiver.

9. The sensor housing assembly according to claim 1, wherein the sensor assembly further comprises a temperature sensing element.

10. The sensor housing assembly according to claim 1, wherein the sensor assembly is disposed on the motor vehicle outside of the passenger compartment.

11. The sensor housing assembly according to claim 10, wherein the sensor assembly is a component of an automated vehicle control system.

12. The sensor housing assembly according to claim 1, wherein the conductive particles are graphene particles.

13. The sensor housing assembly according to claim 1, wherein the conductive particles are fullerene particles.

14. The sensor housing assembly according to claim 1, wherein the conductive particles are carbon nanotubes.

15. The sensor housing assembly according to claim 1, wherein the conductive particles are metallic particles.

16. The sensor housing assembly according to claim 1, wherein the conductive particles are metallic fibers.

17. The sensor housing assembly according to claim 1, wherein the conductive particles are metal plated fiber particles.

18. The sensor housing assembly according to claim 1, wherein the conductive particles metal-plated nanofibers.

19. The sensor housing assembly according to claim 1, wherein the conductive particles are carbon nanotubes.

20. The sensor housing assembly according to claim 1, wherein the conductive particles are graphene nanoparticles.

21. The sensor housing assembly according to claim 1, wherein the conductive particles are graphene oxide nanoparticles.

22. The sensor housing assembly according to claim 4, wherein the optical sensor device is a light detection and ranging (LIDAR) transceiver.

23. The sensor housing assembly according to claim 1, wherein the sensor housing comprises a nonconductive opaque plastic material covering the opening and wherein the sensor device is an ultrasonic transceiver.

* * * * *